United States Patent
Chen et al.

(10) Patent No.: US 11,694,861 B2
(45) Date of Patent: Jul. 4, 2023

(54) LOW-FORCE BUTTON DESIGN

(71) Applicant: GoPro, Inc., San Mateo, CA (US)

(72) Inventors: Chao Chen, San Mateo, CA (US); Marco Marroquin, San Mateo, CA (US); Himay Shukla, Fremont, CA (US)

(73) Assignee: GoPro, Inc., San Mateo, CA (US)

( * ) Notice: Subject to any disclaimer, the term of this patent is extended or adjusted under 35 U.S.C. 154(b) by 279 days.

(21) Appl. No.: 17/257,608

(22) PCT Filed: Jul. 3, 2019

(86) PCT No.: PCT/US2019/040521
§ 371 (c)(1),
(2) Date: Jan. 4, 2021

(87) PCT Pub. No.: WO2020/010211
PCT Pub. Date: Jan. 9, 2020

(65) Prior Publication Data
US 2021/0272759 A1    Sep. 2, 2021

Related U.S. Application Data

(60) Provisional application No. 62/693,702, filed on Jul. 3, 2018.

(51) Int. Cl.
*H01H 13/06* (2006.01)
*G03B 17/08* (2021.01)
(Continued)

(52) U.S. Cl.
CPC .............. *H01H 13/06* (2013.01); *G03B 17/08* (2013.01); *H01H 9/047* (2013.01); *H01H 13/14* (2013.01);
(Continued)

(58) Field of Classification Search
CPC ........ H01H 13/06; H01H 9/047; H01H 13/14; H01H 2009/048; H01H 2223/004;
(Continued)

(56) References Cited

U.S. PATENT DOCUMENTS 5,118,909 A * 6/1992 Husting ................... H01H 3/24
200/81 R
6,047,131 A    4/2000 Smith
(Continued)

FOREIGN PATENT DOCUMENTS

| CN | 204102760 U | 1/2015 |
| CN | 205645622 U | 10/2016 |
| JP | H0536330 A | 2/1993 |

OTHER PUBLICATIONS

International Search Report and Written Opinion for Application No. PCT/US2019/040521, dated Oct. 24, 2019, 6 pages.
(Continued)

*Primary Examiner* — Lheiren Mae A Caroc
(74) *Attorney, Agent, or Firm* — Young Basile Hanlon & MacFarlane, P.C.

(57) ABSTRACT

A button for use with an image capture device in an underwater environment that includes a movable plunger configured to cause actuation of the image capture device and upper and lower components collectively defining an internal cavity that is configured to receive the plunger. The upper and lower components are configured and connected such that actuation of the image capture device is prevented until a threshold pressure is applied to the upper component that is greater than external water pressure applied in the underwater environment. The upper component includes at least one opening that is configured to allow water to enter the internal cavity to modify an internal pressure within the internal cavity so as to reduce the threshold pressure
(Continued)

required to actuate the image capture device in the underwater environment.

20 Claims, 14 Drawing Sheets

(51) Int. Cl.
    *H01H 9/04*     (2006.01)
    *H01H 13/14*     (2006.01)

(52) U.S. Cl.
    CPC . *H01H 2009/048* (2013.01); *H01H 2223/004* (2013.01)

(58) Field of Classification Search
    CPC ............ H01H 9/04; H01H 9/041; H01H 3/02; H01H 3/12; H01H 13/063; H01H 35/24; H01H 35/245; H01H 35/2607; H01H 35/2614; H01H 35/34; H01H 2221/064; H01H 2223/002; H01H 2227/032; H01H 2227/034; G03B 17/08
    See application file for complete search history.

(56) References Cited

U.S. PATENT DOCUMENTS

| | | | |
|---|---|---|---|
| 11,218,627 B2 * | 1/2022 | Chen | G03B 9/08 |
| 2022/0078334 A1 * | 3/2022 | Chen | H04N 5/23238 |

OTHER PUBLICATIONS

International Preliminary Report on Patentability for App. No. PCT/US2019/040521, dated Jan. 14, 2021, 5 pages.

* cited by examiner

LOW-FORCE BUTTON DESIGN

CROSS-REFERENCE TO RELATED APPLICATIONS

This application is a 371 of International Application No. PCT/US2019/040521 filed on Jul. 3, 2019, which claims priority to U.S. Provisional Application No. 62/693,702, filed on Jul. 3, 2018, the entire disclosures of which are hereby incorporated by reference.

TECHNICAL FIELD

The present disclosure relates generally to a low-force button design for use in connection with the operation of one or more features or functions of an image capture device.

BACKGROUND

Image capture devices are used in various applications, including, for example, handheld cameras and video recorders, drones, and vehicles, and may be adapted for use in connection with a wearable support, such as a vest, glove, helmet, hat, etc., or may simply be carried by a user. Image capture devices typically include one or more buttons that are used to operate various features and functions. When exposed to underwater environments, however, external water pressure can act on the sensitive internal switches that govern such operation, causing inadvertent actuation. For example, in the context of shutter actuation, inadvertent operation can render an image capture device unusable in that the shutter may remain perpetually open until the external water pressure is relieved. While external housings can be used to combat this issue by insulating an image capture device from external pressure, such housings can be cumbersome and may complicate use. A button designed to offset and/or account for the external pressure applied in an underwater environment would, thus, be advantageous in that it would eliminate the need for any such housing.

SUMMARY

In one aspect of the present disclosure, a button is disclosed for use with an image capture device in an underwater environment. The button includes a movable plunger that is configured to cause actuation of the image capture device, and upper and lower components collectively defining an internal cavity that is configured to receive the plunger. The upper and lower components are configured such that actuation of the image capture device is prevented until a threshold pressure is applied to the upper component that is greater than external water pressure applied to the upper component in the underwater environment. The upper component includes at least one opening that is configured to allow water to enter the internal cavity to modify an internal pressure within the internal cavity so as to reduce the threshold pressure required to actuate the image capture device in the underwater environment.

In certain embodiments, the upper component may include a first sealing member, and the lower component may include a second sealing member. In certain embodiments, the first and second sealing members may be configured to engage an internal surface of the image capture device to inhibit water from entering the image capture device. In certain embodiments, the first sealing member may be formed integrally with the upper component, and the second sealing member may be formed integrally with the lower component. In certain embodiments, the lower component may define a receptacle that is configured to receive the plunger. In certain embodiments, the plunger may define a first transverse cross-sectional dimension, and the receptacle may define a second transverse cross-sectional dimension larger than the first transverse cross-sectional dimension such that a gap is defined between the plunger and the receptacle that is configured to collect water entering the button. In certain embodiments, the upper component may include inner and outer members. In certain embodiments, the inner and outer members of the upper component may be configured as discrete structures. In certain embodiments, the lower component may include inner and outer members. In certain embodiments, the inner and outer members of the lower component may be configured as discrete structures. In certain embodiments, the upper component and the lower component may be sealed together to inhibit water from entering the button other than through the at least one opening in the upper component. In certain embodiments, the lower component may define a channel that is configured to receive the upper component. In certain embodiments, the plunger may be secured to one of the upper and lower components. It is envisioned that the button described above may include any combination of the features and the elements described in this paragraph.

In another aspect of the present disclosure, an image capture device is disclosed that is configured for use in an underwater environment. The image capture device includes: a body defining a recess; a switch that is positioned within the body; and a button that is positioned within the recess in the body such that the button is movable from an inactive position to an active position to thereby actuate the switch and cause operation of the image capture device. The button is configured such that movement from the inactive position to the active position is prevented until a threshold pressure is applied to the button that is greater than external water pressured applied to the button in the underwater environment.

In certain embodiments, the button may include: a plunger; a lower component; and an upper component that is secured to the lower component, wherein the plunger is secured to one of the lower and upper components, and the lower and upper components collectively define an internal cavity that is configured to receive the plunger such that the plunger is movable within the internal cavity. In certain embodiments, the upper component may include at least one opening that is configured to allow water to enter the internal cavity to modify an internal pressure within the internal cavity so as to reduce the threshold pressure required to move the button from the inactive position to the active position in the underwater environment. In certain embodiments, the lower component may include a first sealing member, and the upper component may include a second sealing member, wherein the first and second sealing members are configured to engage an internal surface of the body to inhibit water from entering the body. In certain embodiments, the first sealing member may be formed integrally with the lower component, and the second sealing member may be formed integrally with the upper component. It is envisioned that the image capture device described above may include any combination of the features and the elements described in this paragraph.

In another aspect of the present disclosure, a method is disclosed of assembling a button for use with an image capture device is disclosed that includes: forming an upper component by securing together inner and outer members; forming a lower component by securing together inner and outer members; securing a plunger to one of the upper and lower components; connecting the upper component and the lower component such that actuation of the image capture device is prevented until a threshold pressure is applied to the upper component that is greater than external water pressure applied to the upper component in an underwater environment upon submersion of the image capture device; and forming at least one opening in the upper component such that water is allowed to enter an internal cavity defined between the upper component and the lower component to modify an internal pressure within the internal cavity so as to reduce the threshold pressure required to actuate the image capture device in the underwater environment.

In certain embodiments, connecting the upper and lower components may include positioning the plunger within a receptacle of the lower component, wherein the receptacle defines a transverse cross-sectional dimension that is greater than a transverse cross-sectional dimension defined by the plunger such that a gap is formed between the plunger and the receptacle that is configured to collect water entering the button. In certain embodiments, connecting the upper component and the lower component may include sealing the upper component and the lower component together to inhibit water from entering the button other than through the at least one opening in the upper component. It is envisioned that the method described above may include any combination of the features and the elements described in this paragraph.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1A:
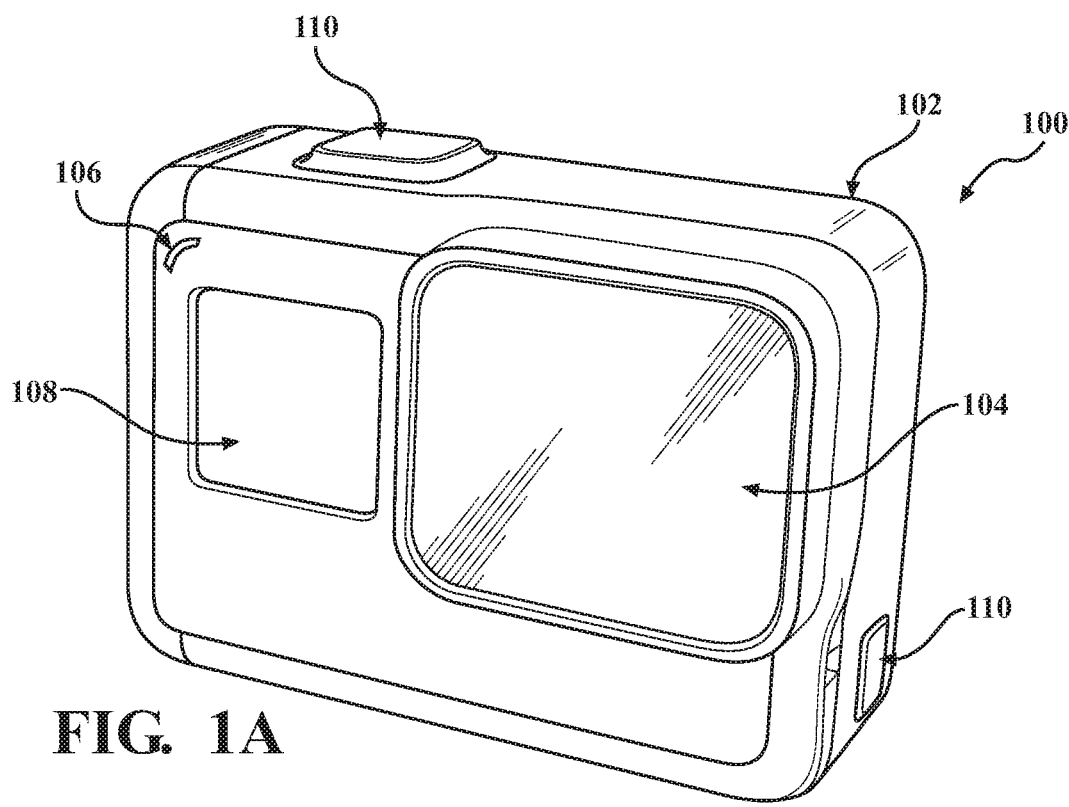
FIGS. 1A-D are isometric views of an example of an image capture device.

The present disclosure describes a low-force button for use in operating various features and functions of an image capture device (e.g., shutter operation). The button includes upper and lower components that each include inner and outer members. The upper and lower components collectively define an internal cavity that receives a movable (repositionable) plunger. More specifically, the plunger is positioned within a receptacle defined by the outer member of the lower component. The upper member includes one or more openings (apertures) that allow water to enter the internal cavity upon submersion.

To displace the plunger, and cause operation (e.g., of the shutter), the button requires the application of threshold pressure, which is greater than the external pressure applied in the underwater environment to prevent inadvertent operation (e.g., opening of the shutter). In addition to offsetting external pressure applied in the underwater environment, the water allowed to enter the internal cavity modifies the pressure within the internal cavity that acts upon the lower component of the button. This modified internal pressure supplements the operational pressure (force) applied by a user upon depression of the button (and movement of the plunger), which thereby decreases the magnitude of the operational pressure that must be applied to actuate the image capture device in the underwater environment.

In certain embodiments, it is envisioned that the button may be configured to reduce the differential between the operational pressures required to actuate the image capture device above and below water to maintain a generally consistent tactile feel during use, regardless of the environment.

FIGS. 1A-D are isometric views of an example of an image capture device 100. The image capture device 100 may include a body 102 having a lens 104 structured on a front surface of the body 102, various indicators on the front surface of the body 102 (such as LEDs, displays, and the like), various input mechanisms (such as buttons, switches, and touchscreen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and an LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
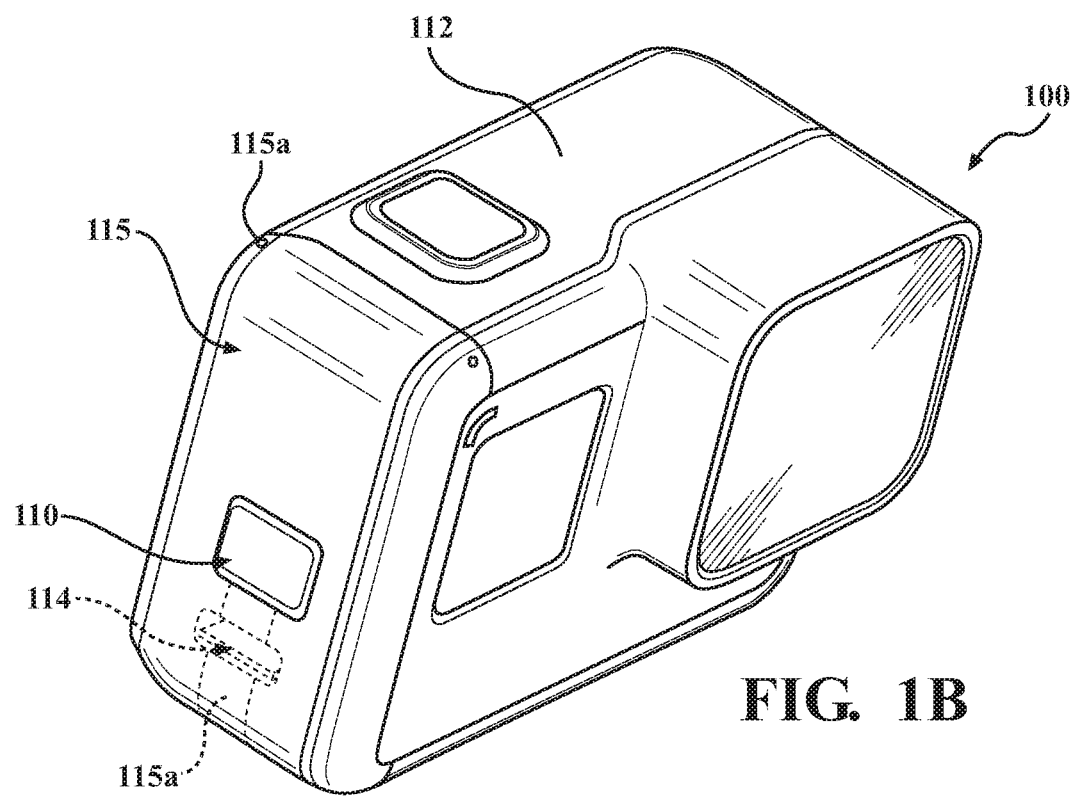
Figure 1C:
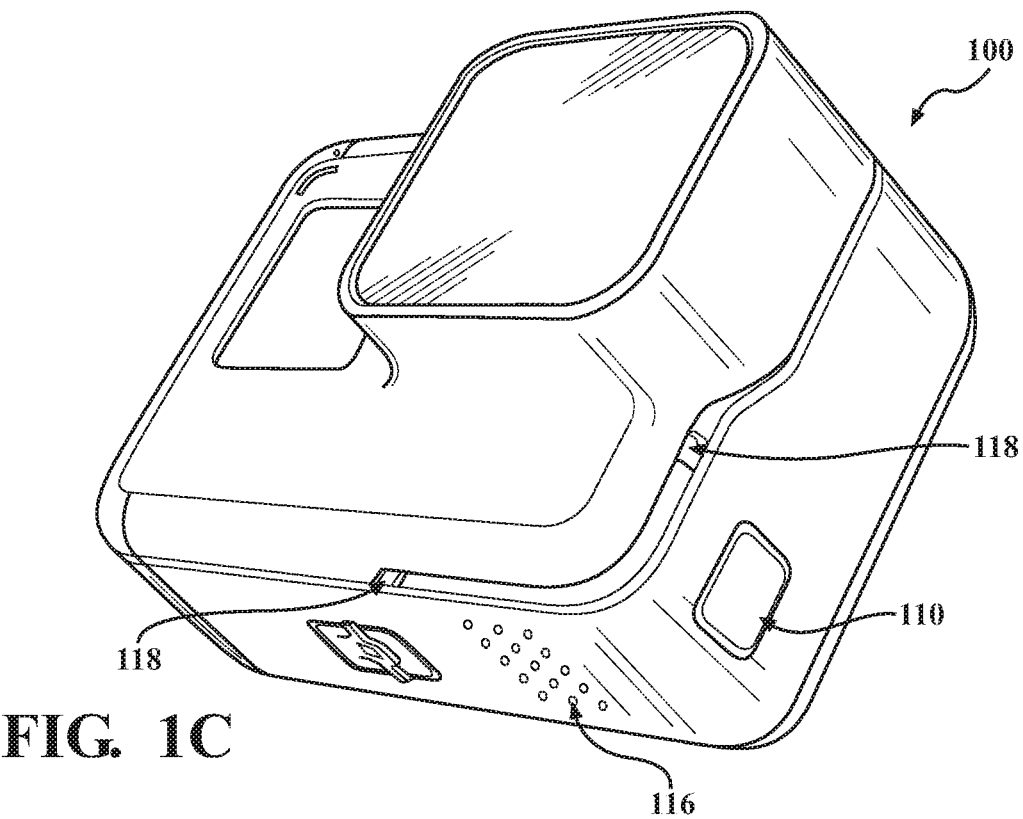
Figure 1D:
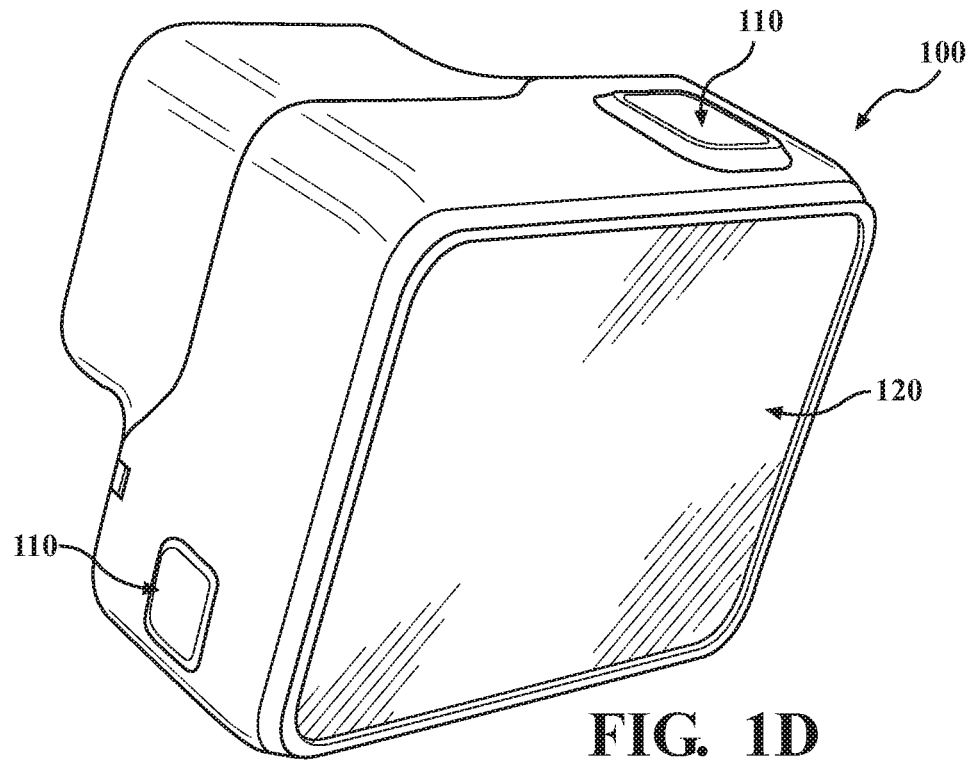

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described herein. For example, the image capture device 100 may include additional buttons or different interface features, such as interchangeable lenses, cold shoes and hot shoes that can add functional features to the image capture device 100, etc.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the Internet, may be used.

In some implementations, the computing communication link may be a Wi-Fi link, an infrared link, a Bluetooth (BT) link, a cellular link, a ZigBee link, a near-field communications (NFC) link (such as an ISO/IEC 20643 protocol link), an Advanced Network Technology interoperability (ANT+) link, and/or any other wireless communications link or combination of links.

In some implementations, the computing communication link may be an HDMI link, a USB link, a digital video interface link, a display port interface link (such as a Video Electronics Standards Association (VESA) digital display interface link), an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
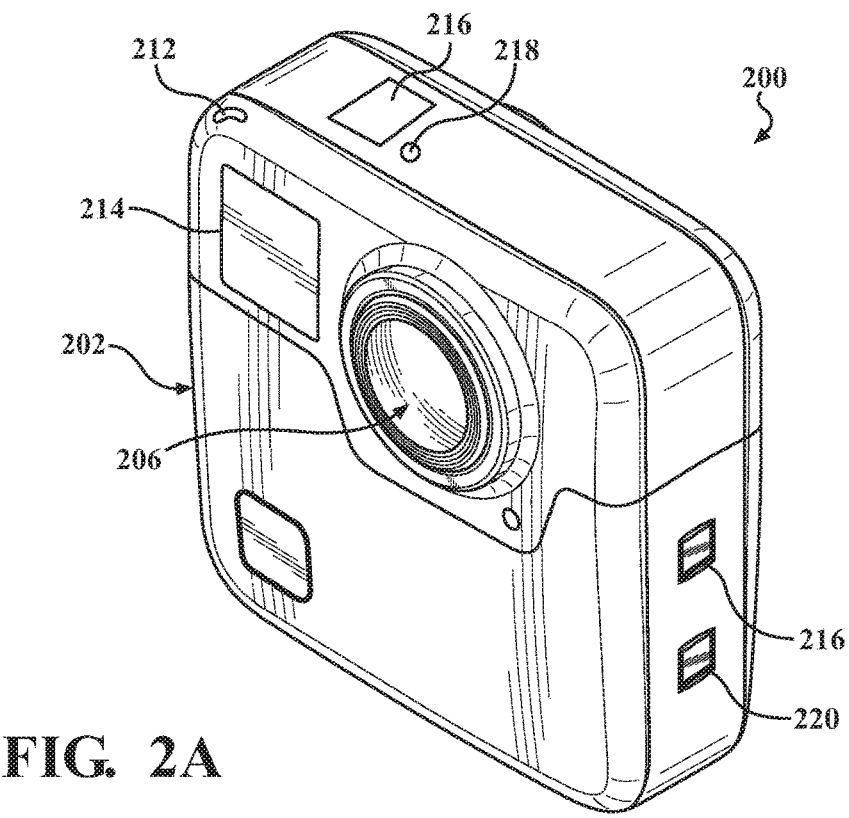
FIGS. 2A-B are isometric views of another example of an image capture device.
Figure 2B:
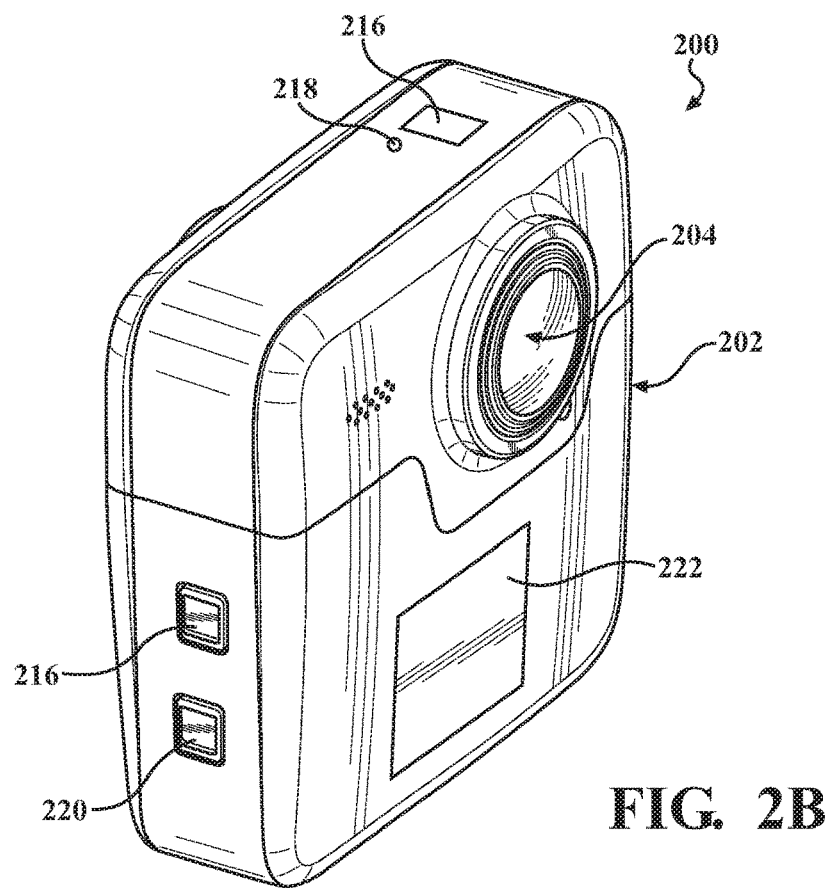

FIGS. 2A-B illustrate another example of an image capture device 200. The image capture device 200 includes a body 202 and two camera lenses 204, 206 disposed on opposing surfaces of the body 202, for example, in a back-to-back or Janus configuration. Although generally depicted as a camera, it should be appreciated that the particular configuration of the image capture device 200 may be varied in alternate embodiments of the disclosure. For example, it is envisioned that the image capture device 200 may instead take the form of a cell phone.

The image capture device may include electronics (e.g., imaging electronics, power electronics, etc.) internal to the body 202 for capturing images via the lenses 204, 206 and/or performing other functions. The image capture device may include various indicators, such as an LED light 212 and an LCD display 214.

The image capture device 200 may include various input mechanisms, such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
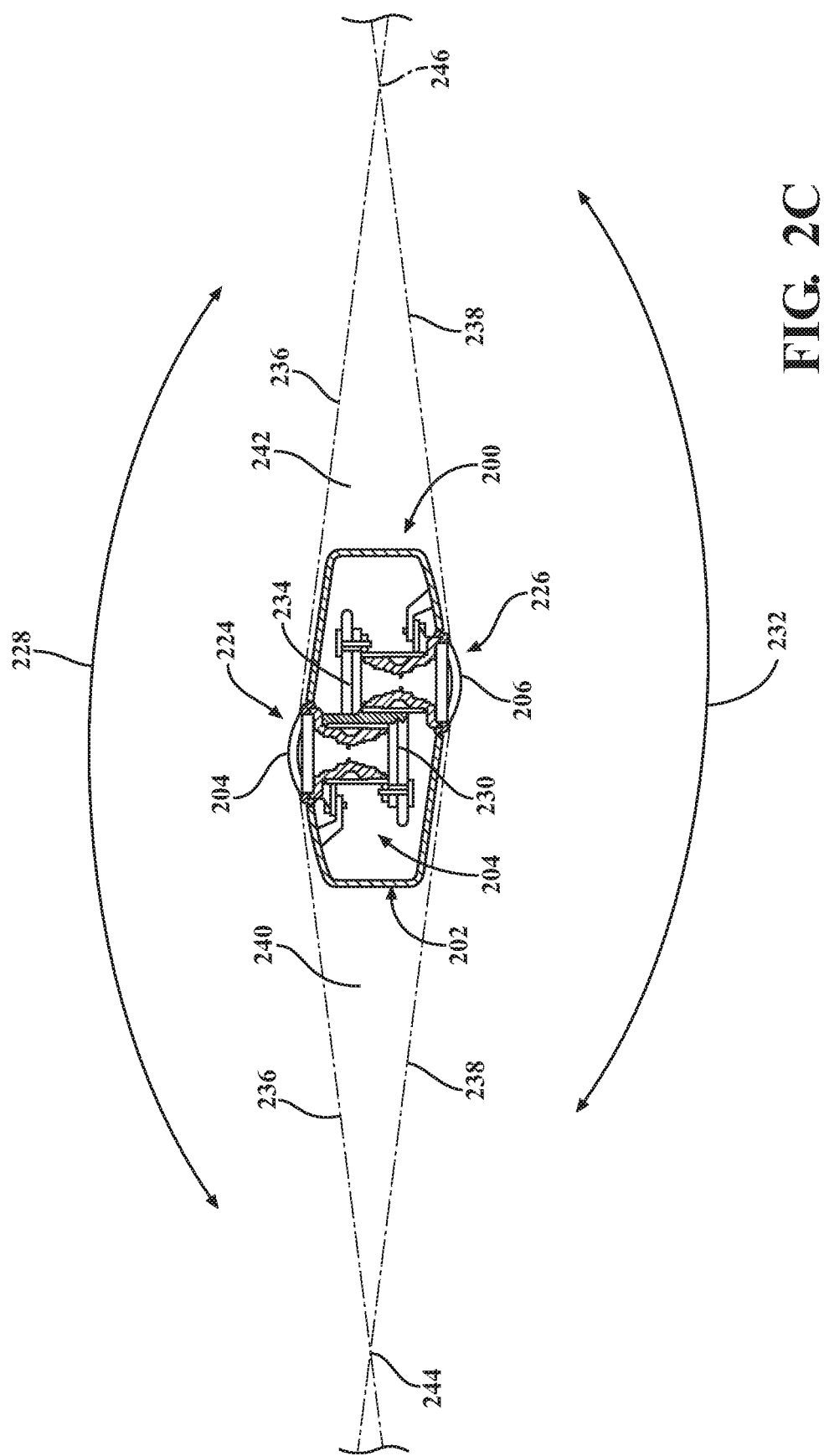
FIG. 2C is a cross-sectional view of the image capture device of FIGS. 2A-B.

FIG. 2C is a cross-sectional view of an optical module 223 of the image capture device 200 of FIGS. 2A-B. The optical module 223 facilitates the capture of spherical images, and, accordingly, includes a first image capture device 224 and a second image capture device 226. The first image capture device 224 defines a first field-of-view 228, as shown in FIG. 2C, and includes a first integrated sensor-lens assembly (ISLA) 229 that receives and directs light onto a first image sensor 230 via the lens 204. Similarly, the second image capture device 226 defines a second field-of-view 232, as shown in FIG. 2C, and includes a second ISLA 233 that receives and directs light onto a second image sensor 234 via the lens 206. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242, may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, the stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 3B:
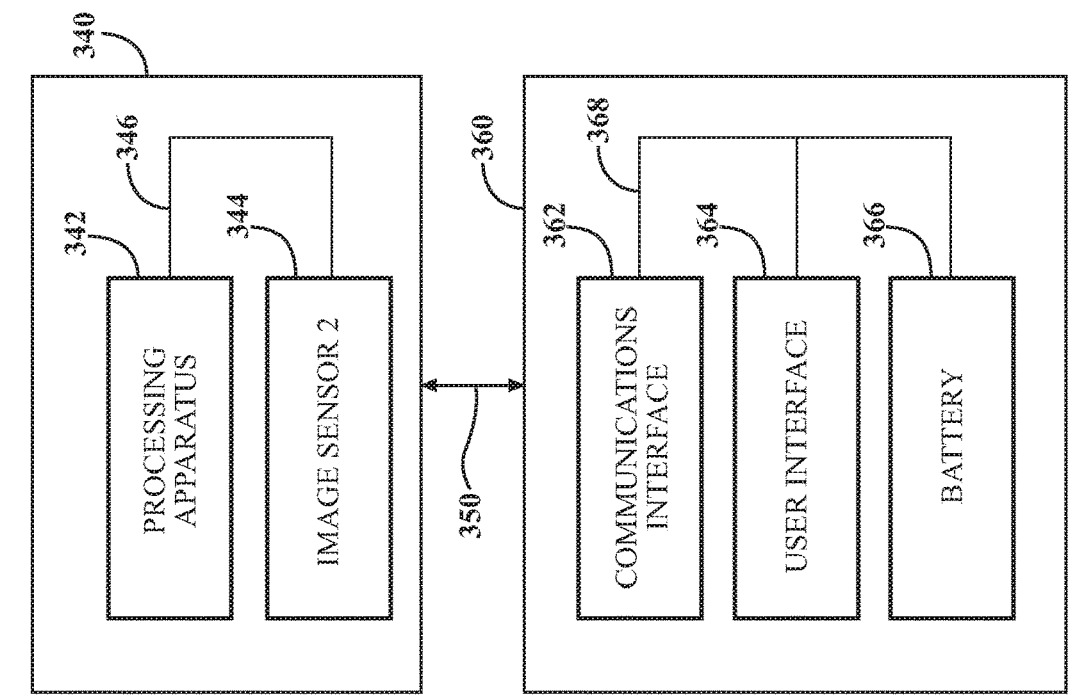
FIGS. 3A-B are block diagrams of examples of image capture systems.
Figure 3A:
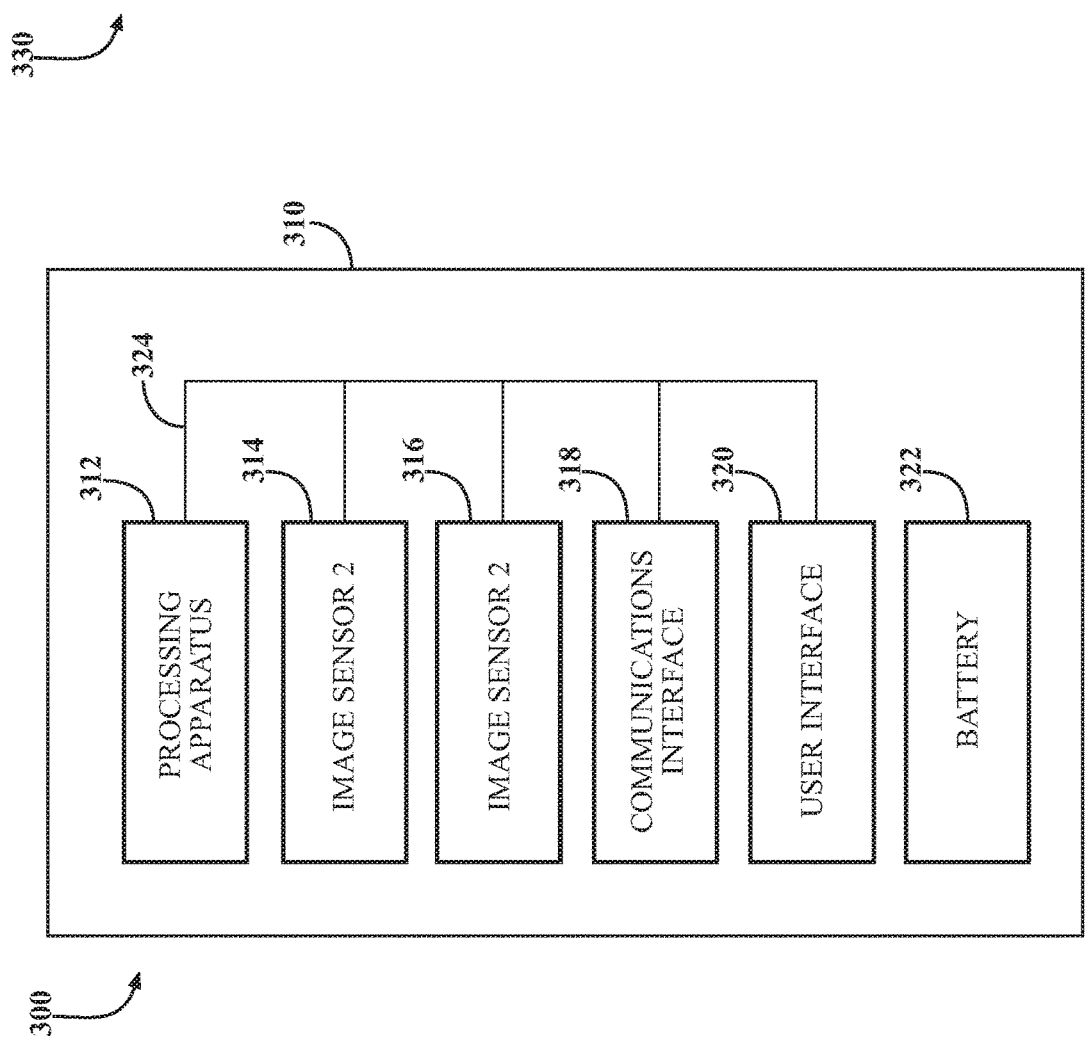
Figure 4:
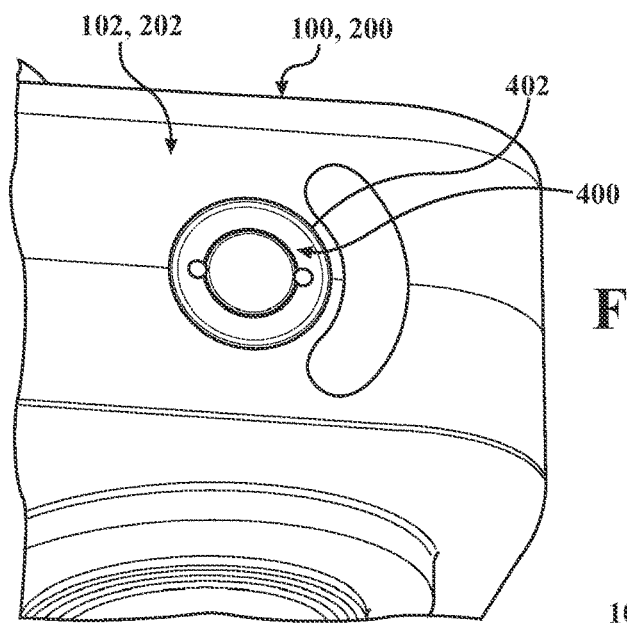
FIG. 4 is a partial top, perspective view of an image capture device including a low-force button in accordance with the principles of the present disclosure.
Figure 5:
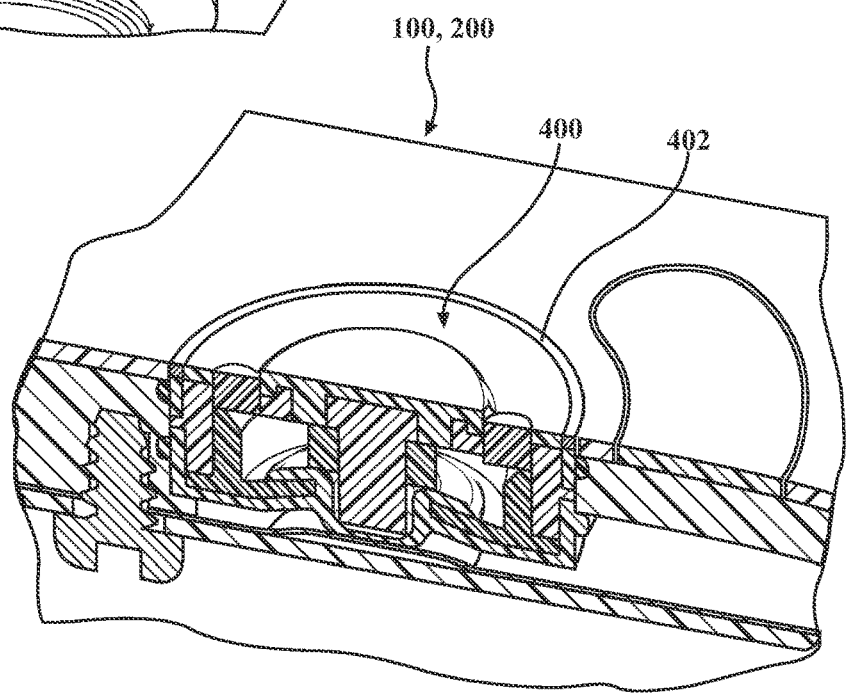
FIG. 5 is a partial, top, cross-sectional view of the image capture device and the button seen in FIG. 4.
Figure 6:
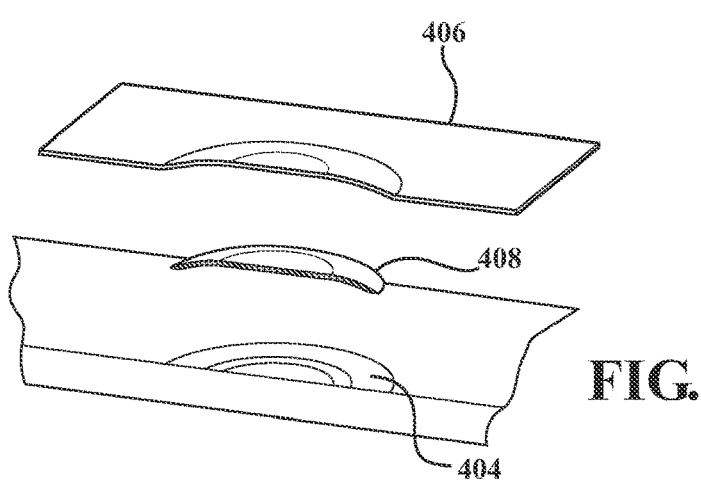
FIG. 6 is a partial, cross-sectional view of the image capture device (with parts separated) showing an internal switch of the image capture device actuable by the button.
Figure 7:
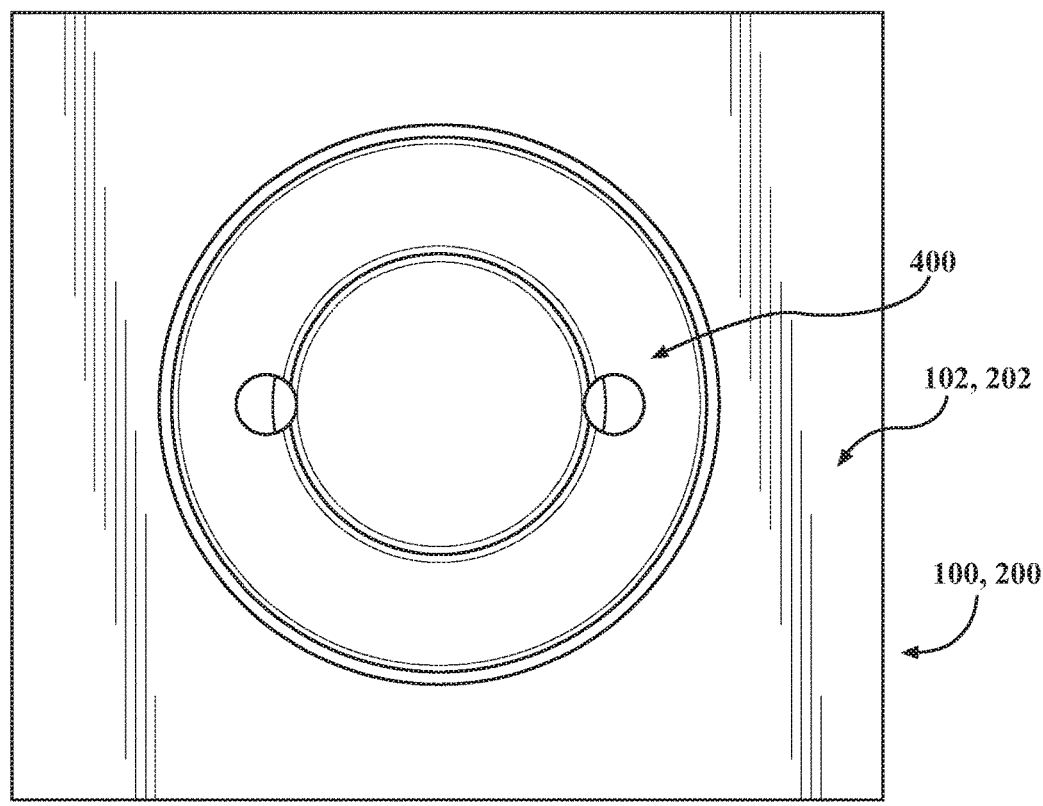
FIG. 7 is a top, plan view of the button.
Figure 8:
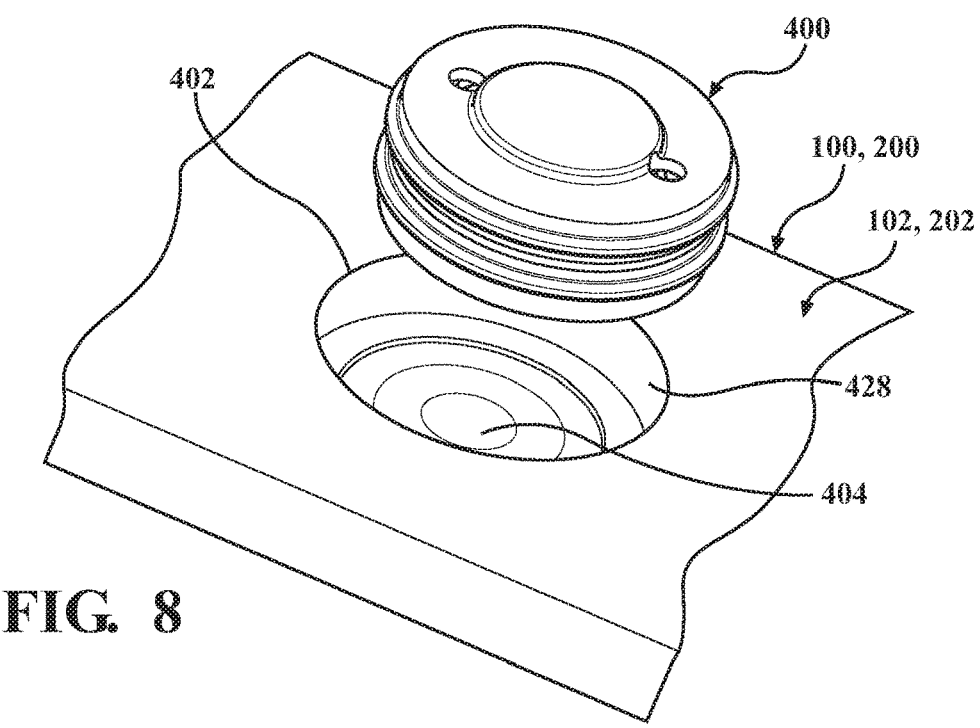
FIG. 8 is a top, perspective view of the button shown separated from the image capture device.
Figure 9:
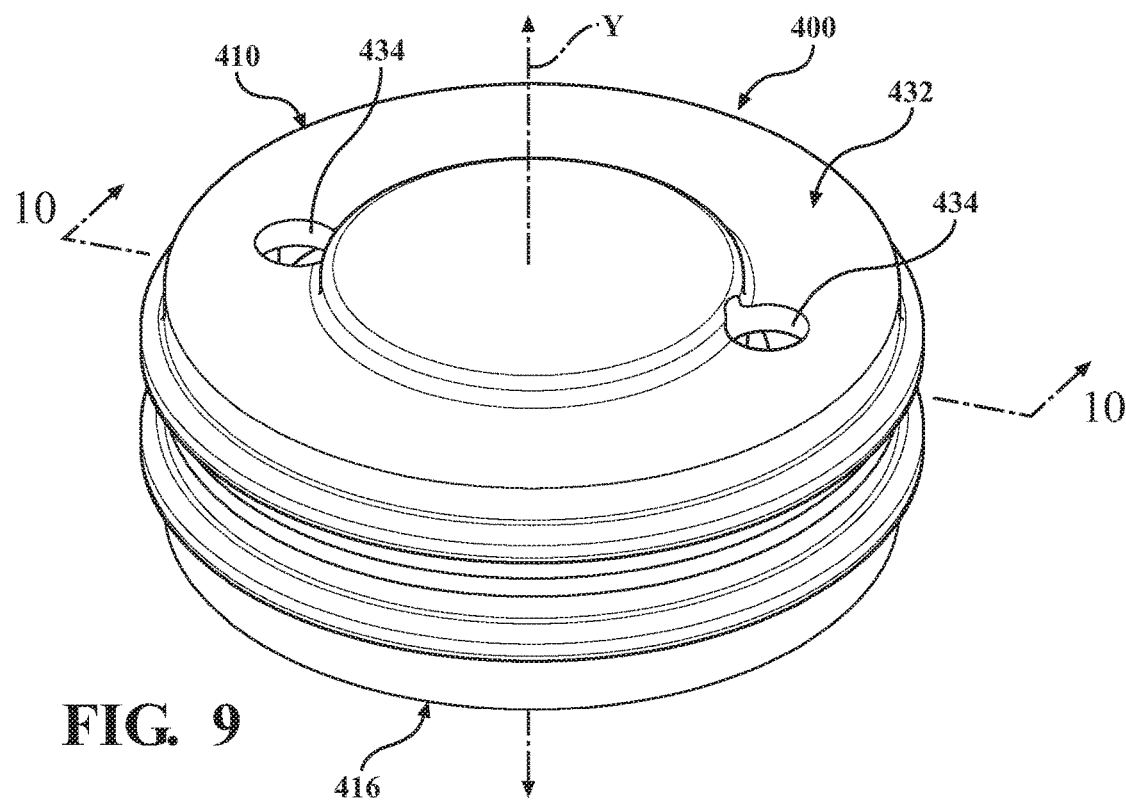
FIG. 9 is a top, perspective view of the button.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316.

The processing apparatus 312 may include one or more processors having single or multiple processing cores. The processing apparatus 312 may include memory, such as a random-access memory (RAM) device, flash memory, or another suitable type of storage device, such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields-of-view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may be used to implement some or all of the techniques described in this disclosure.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device, such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure.

With reference now to FIGS. 4-8, a low-force button 400 is illustrated for use with an image capture device (e.g., the image capture device 100 (FIG. 1) or the image capture device 200 (FIG. 2A) to capture digital data including, for example, images, video, and audio, or otherwise operate the image capture device 100/200. Although shown throughout the figures and discussed herein in connection with shutter operation (not shown), it should be appreciated that the button 400 may be used in connection with the operation of a variety of functions, including, for example, powering the image capture device 100/200 on and off, selecting between modes of operation, zoom functionality, etc. Additionally, although the image capture device 100/200 is illustrated and described as including a single button 400, it should be appreciated that the number of buttons 400 included on the image capture device 100/200, and the location(s) of the buttons 400, may be varied in alternate embodiments of the present disclosure (e.g., the image capture device 100/200 may include a plurality of buttons 400 in various locations).

The button 400 is configured and positioned within a recess 402 formed in the body 102/202 of the image capture device 100/200 proximate an electronic switch 404 (FIGS. 6, 8) such that depression of the button 400 activates the switch 404 to cause a particular function or operation (e.g., operation of the shutter). More specifically, upon depression of the button 400, the button 400 applies a force to an overlay 406 (FIG. 6) positioned above a metallic dome 408 to deflect the metallic dome 408, and thereby establish the electrical contact required to perform the particular function(s) associated with the button 400 (e.g., via a printed circuit board (PCB), a flexible printed circuit (FPC), a cable, etc.).

With reference now to FIGS. 9-19 as well, which provide various perspective and cross-sectional views of the button 400 (and/or the components thereof), the button 400 includes an upper component 410 including respective outer and inner members 412, 414, and a lower component 416 including respective outer and inner members 418, 420. In one particular embodiment, it is envisioned that the outer members 412, 418 may include (e.g., may be formed from) one material and that the inner members 414, 420 may include (e.g., may be formed from) another material. For example, the outer members 412, 418 may include (e.g., may be formed partially or entirely from) a compliant, rubberized material whereas the inner members 414, 420 may include (e.g., may be formed partially or entirely from) a more rigid material (e.g., plastic, metal, etc.). It is envisioned that the various components of the button 400 may be formed through any suitable method of manufacture, including, for example, injection molding, casting, 3-D printing, or the like.

The upper component 410 and the lower component 416 of the button 400 collectively define an internal cavity 422 (FIG. 10) that accommodates a movable (repositionable) plunger 424. It is envisioned that the plunger 424 may be secured to the upper component 410 or the lower component 416 in any suitable manner (e.g., via press-fit and/or through the use of an adhesive, etc.). Upon depression of the button 400, the plunger 424 travels vertically within the internal cavity 422 (e.g., along a central longitudinal axis Y (FIGS. 9, 10) of the button 400) to thereby apply a force to the dome 408 (FIG. 6) and activate the switch 404, as discussed above.

Each of the outer members 412, 418 includes one or more sealing members 426 (FIG. 10), that are configured for engagement with an inner wall 428 (FIG. 8) of the recess 402 in the body 102/202 of the image capture device 100/200 to inhibit (if not entirely prevent) the entry of water, debris, etc., into the body 102/202 of the image capture device 100/200. In the illustrated embodiment, for example, the sealing members 426 are configured as O-rings 430u, 430l that are integrally formed with the outer members 412, 418, respectively.

FIGS. 11-14 provide various perspective views of the upper component 410 of the button 400. The outer member 412 of the upper component 410 includes a cap 432 defining one or more openings 434 that extend therethrough so as to permit the flow of water into and out of the internal cavity 422 for reasons detailed herein below. Although shown as including a pair of diametrically opposed, generally circular openings 434 in the illustrated embodiment, it should be appreciated that the number, location, and/or configuration of the opening(s) 434 may be varied in alternate embodiments of the disclosure. The outer member 412 further includes a generally circular outer wall 436, from which, the O-ring 430u extends radially outward.

Figure 13:
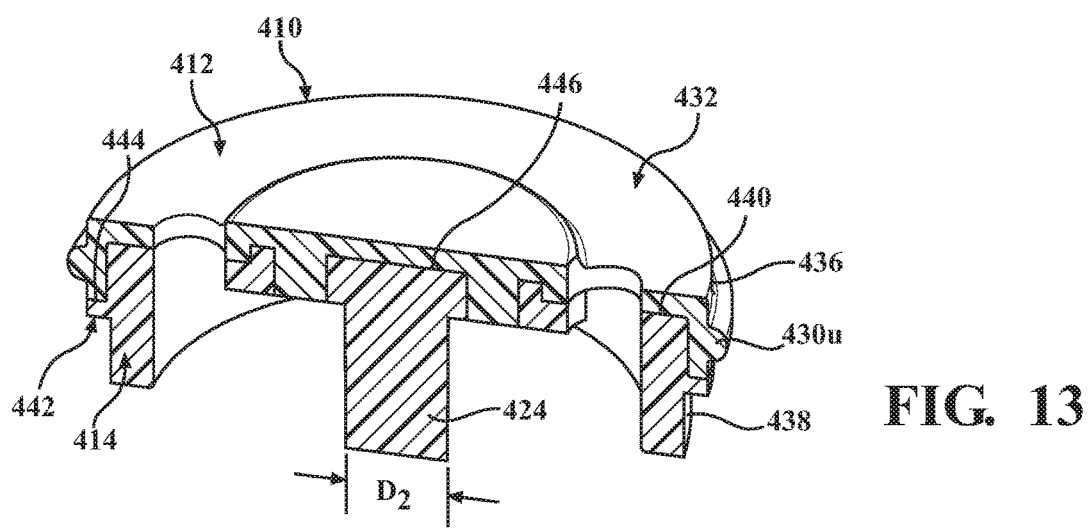
FIG. 13 is a cross-sectional view of the upper component of the button taken along line 13-13 in FIG. 11.
Figure 14:
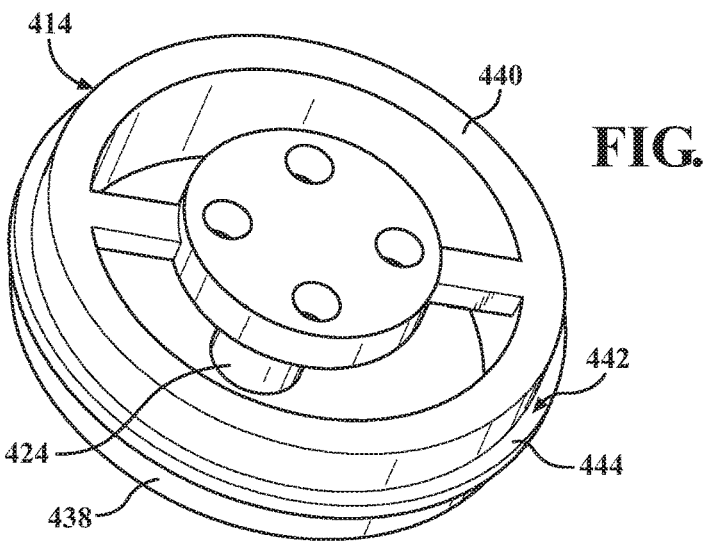
FIG. 14 is a top, perspective view of the inner member of the upper component.
Figure 15:
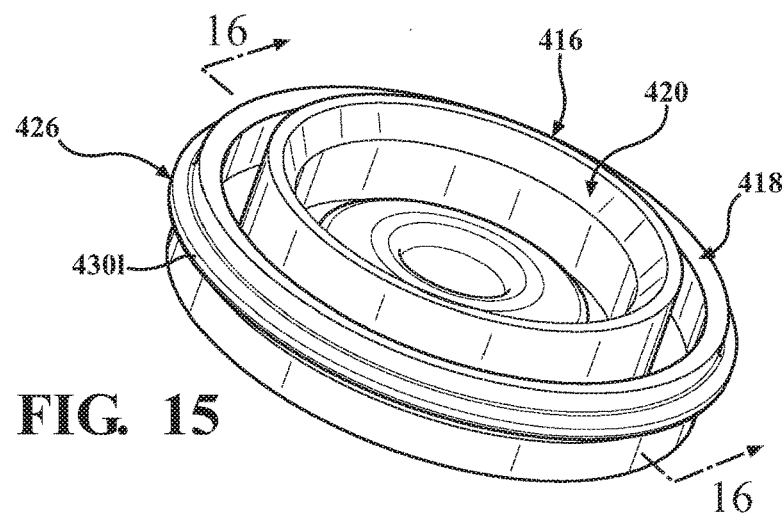
FIG. 15 is a top, perspective view of a lower component of the button including an inner member and an outer member.

The inner member 414 of the upper component 410 includes a generally circular outer wall 438 defining an upper end 440 (FIG. 13). The inner member 414 further includes a flange 442 that extends radially outward from the outer wall 438 so as to define a shoulder 444. In the illustrated embodiment, the plunger 424 is shown as being a component of the inner member 414 of the upper component 410, and as being received within a recess 446 (FIG. 13) defined by the cap 432 of the outer member 412 (e.g., such that the plunger 424 and the outer member 412 are generally coaxial in relation). However, as discussed above, in alternate embodiments of the disclosure, the plunger 424 may instead constitute a component of the inner member 420 of the lower component 416.

It is envisioned that the respective inner and outer members 414, 416 of the upper component 410 may be secured together in any suitable manner. For example, the plunger 424 may be press-fit into the recess 446 formed in the cap 432. Additionally, or alternatively, the outer member 412 of the upper component 410 may be overmolded onto the inner member 414 of the upper component 410 and/or secured to the inner member 414 through the use of an adhesive (e.g., between the cap 432 and the plunger 424, and/or between the outer walls 436, 438). Upon assembly, the outer member 412 of the upper component 410 is positioned such that the outer member 412 is supported by (e.g., adjacent to) the upper end 440 of the outer wall 438, and the flange 442 of the inner member 414.

FIGS. 15-18 provide various perspective views of the lower component 416 of the button 400. The outer member 418 of the lower component 416 includes a lower (generally horizontal) wall 448, and an upstanding (generally circular) outer wall 450, from which, the O-ring 430l extends radially outward. The outer wall 450 terminates in an upper end 452 that is configured for contact with the flange 442 (FIG. 13) of the inner member 414 of the upper component 410. The outer member 418 of the lower component 416 further includes a receptacle 454 (FIG. 16) that is configured to receive the plunger 424. More specifically, the receptacle 454 includes an inner wall 456 that defines a receiving space 458, and a radial flange 460 that extends outwardly from the inner wall 456. The receiving space includes a transverse cross-sectional dimension (e.g., diameter) D1 (FIG. 16) greater than a transverse cross-sectional dimension D2 (FIG. 13) of the plunger 424 such that an annular gap G (FIG. 10) is defined between the plunger 424 and the inner wall 456 of the receptacle 454.

Figure 16:
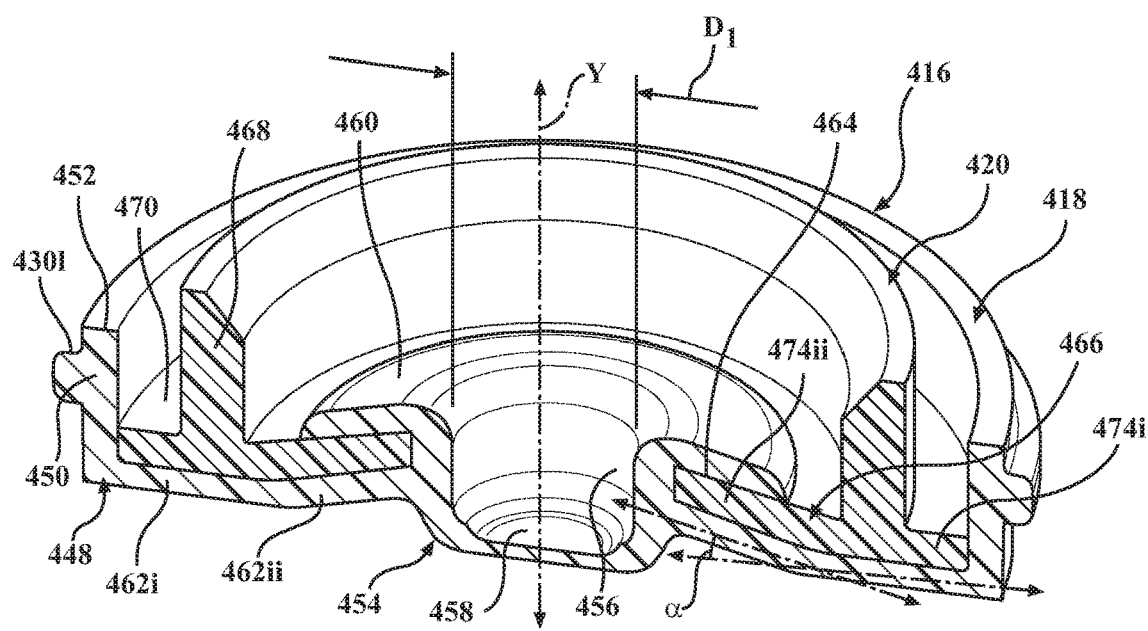
FIG. 16 is a cross-sectional view of the lower component of the button taken along line 16-16 in FIG. 15.
Figure 17:
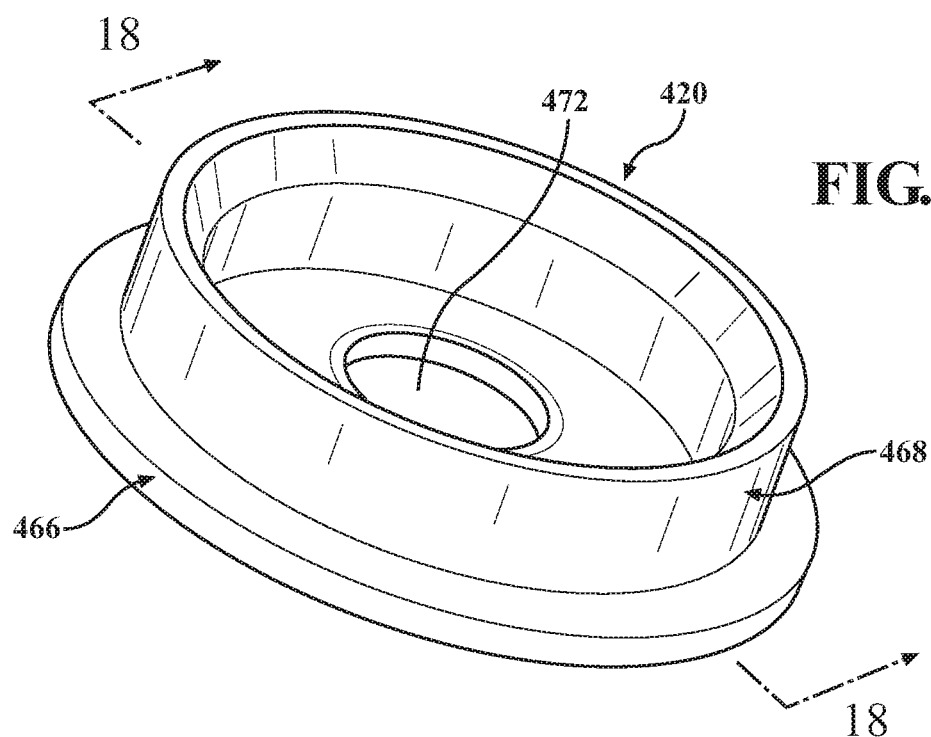
FIG. 17 is a top, perspective view of the inner member of the lower component.

As seen in FIG. 16, the lower wall 448 of the outer member 418 includes a first segment 462i that extends in generally orthogonal relation to the central longitudinal axis Y of the button 400, and a second segment 462ii that extends from the first segment 462i at an upward angle $\alpha$ into contact with the receptacle 454. Together with the radial flange 460, the second segment 462ii defines an annular recess (pocket) 464 that is configured to receive the inner member 420 of the lower component 416.

Figure 10:
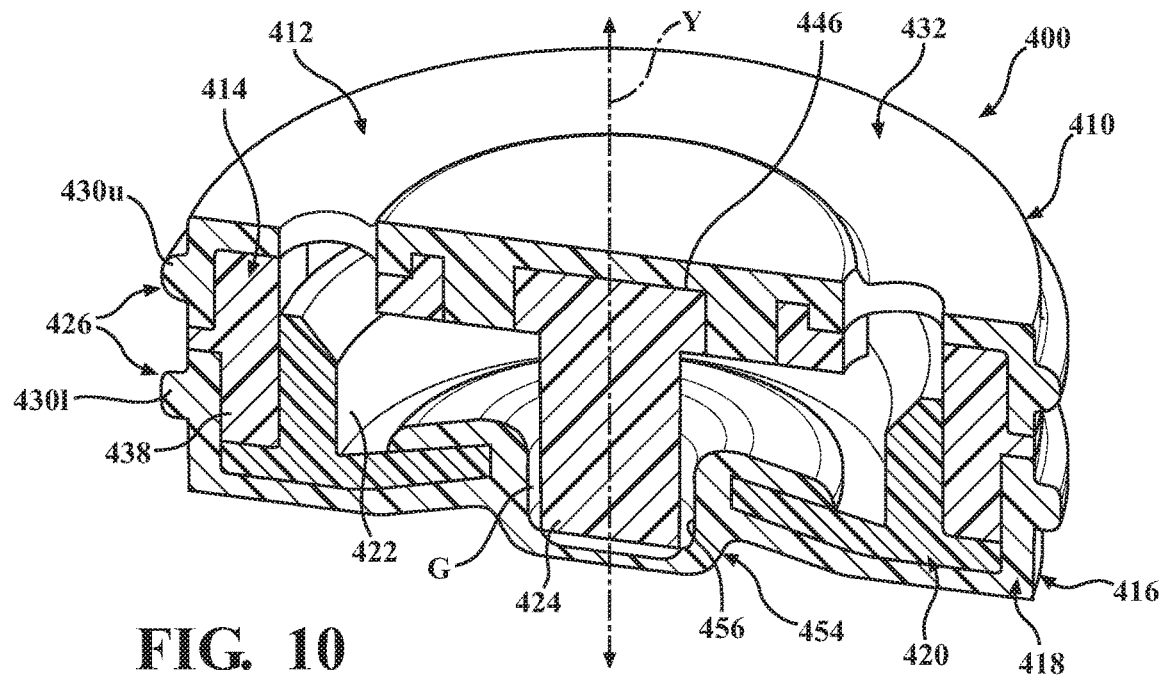
FIG. 10 is a cross-sectional view of the button taken along line 10-10 in FIG. 9.
Figure 11:
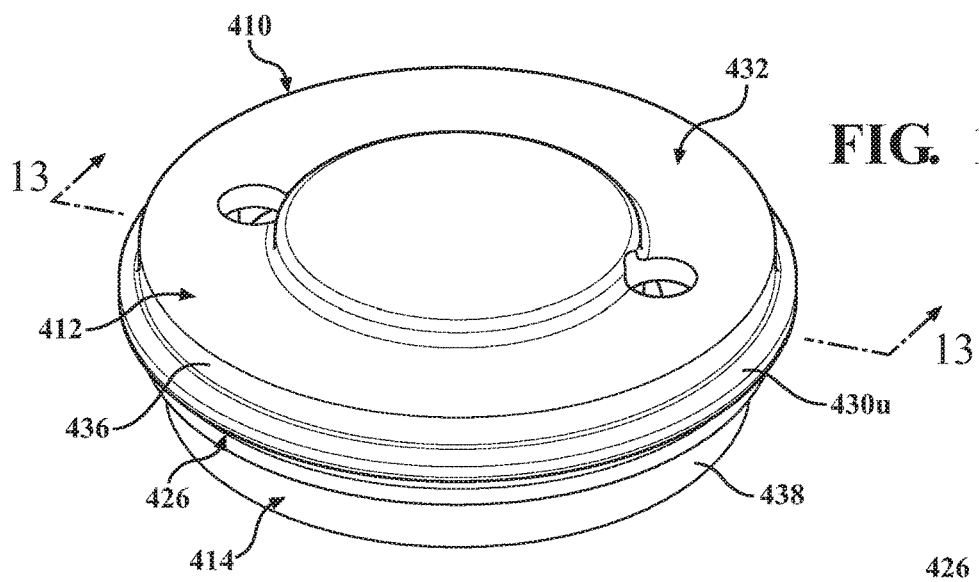
FIG. 11 is a top, perspective view of an upper component of the button including an inner member and an outer member.
Figure 12:
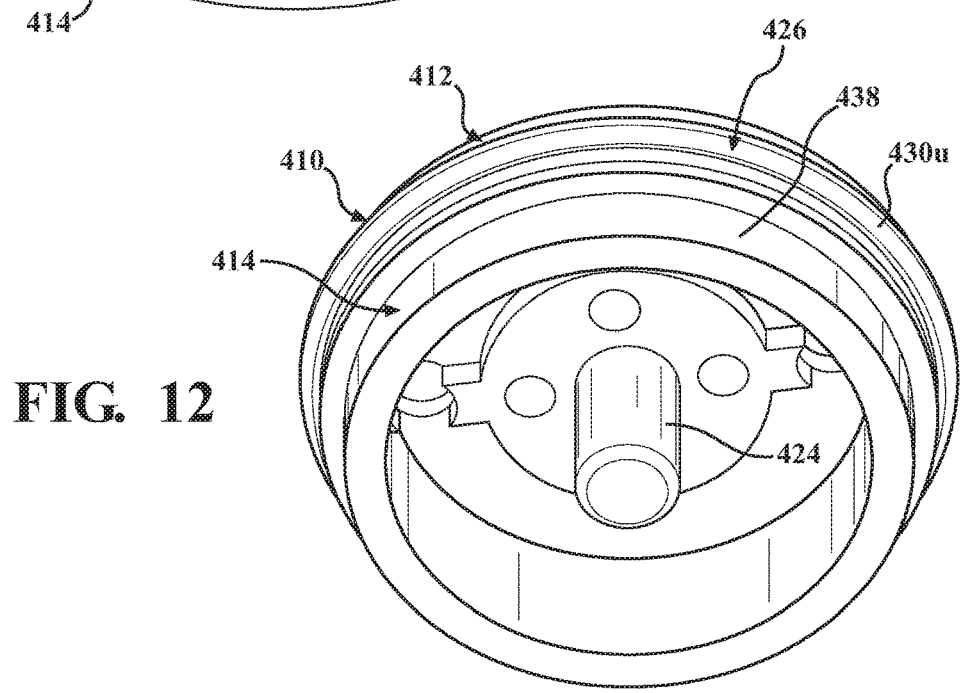
FIG. 12 is a bottom, perspective view of the upper component of the button.

The inner member 420 of the lower component 416 includes a base wall 466, and an upstanding (generally circular) sidewall 468 that extends vertically from the base wall 466. The sidewall 468 is spaced inwardly from a periphery of the base wall 466 such that a channel 470 (FIG. 16) is defined between the sidewall 468 of the inner member 420 and the outer wall 450 of the outer member 418 upon assembly of the lower component 416 of the button 400. As seen in FIG. 10, for example, the channel 470 is configured to receive the outer wall 438 of the inner member 414 of the upper component 410.

Figure 18:
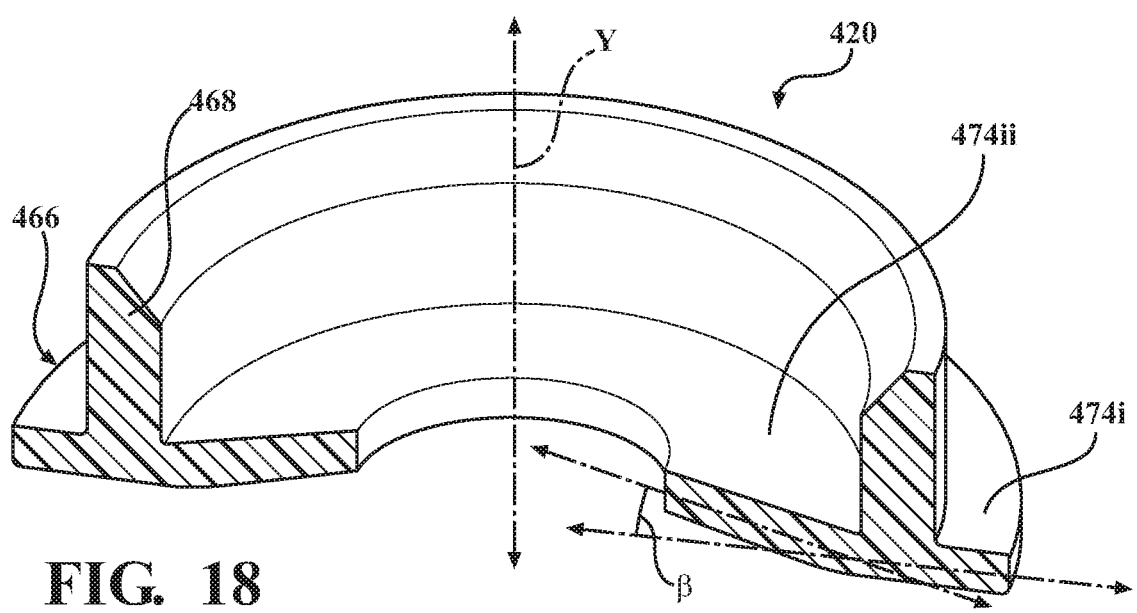
FIG. 18 is a cross-sectional view of the inner member of the lower component taken along line 18-18 in FIG. 17.

The base wall 466 defines an opening 472 (FIG. 17) that is configured to receive the receptacle 454, and includes respective first and second segments 474i, 474ii. The first segment 474i extends radially outward from the sidewall 468 (i.e., away from the central longitudinal axis Y), and the second segment 474ii extends radially inward from the sidewall 468 towards the opening 472 (and the central longitudinal axis Y). As seen in FIGS. 16 and 18, the first segment 474i is oriented in generally orthogonal relation to the central longitudinal axis Y of the button 400 and in generally parallel relation to the first segment 462i of the lower wall 448, and the second segment 474ii extends at an upward angle $\theta$ in general correspondence with the second segment 462ii of the lower wall 448 (i.e., such that the angles $\alpha$, $\beta$ are substantially equivalent or identical). The second segment 474ii is configured for extension into the annular recess 464 (FIG. 16) defined by the outer member 418 between the radial flange 460 and the lower wall 448 of the outer member 418 of the lower component 416.

It is envisioned that the respective outer and inner members 418, 420 of the lower component 416 may be secured together in any suitable manner. For example, it is envisioned that the inner member 420 may be press-fit into the outer member 418 such that receipt of the second segment 474ii by the annular recess 464 (and/or frictional contact between the first segment 474i and the outer wall 450 of the outer member 418) establishes and maintains a secured connection between the outer member 418 and the inner member 420 of the lower component 416. Additionally, or alternatively, the outer member 418 and the inner member 420 may be secured together via overmolding of the radial flange 460 onto the second segment 474ii of the base wall 466, and/or through the use of an adhesive (e.g., between the radial flange 460 and the second segment 474ii of the base wall 466, and/or between the lower wall 448 of the outer member 418 and the base wall 466).

Figure 19:
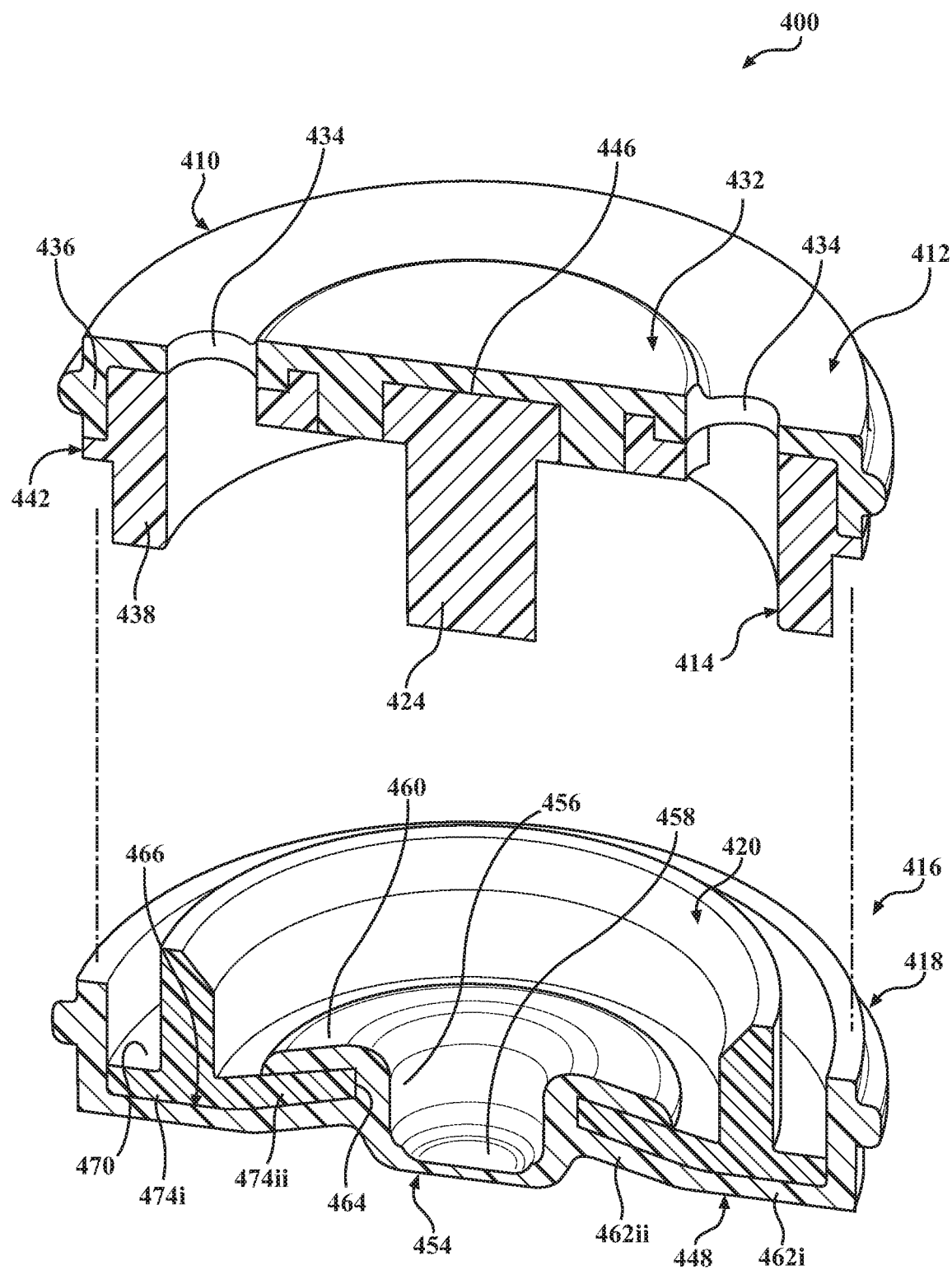
FIG. 19 is a cross-sectional view of the button taken along line 10-10 in FIG. 9 shown with the upper component separated from the lower component.
Figure 20:
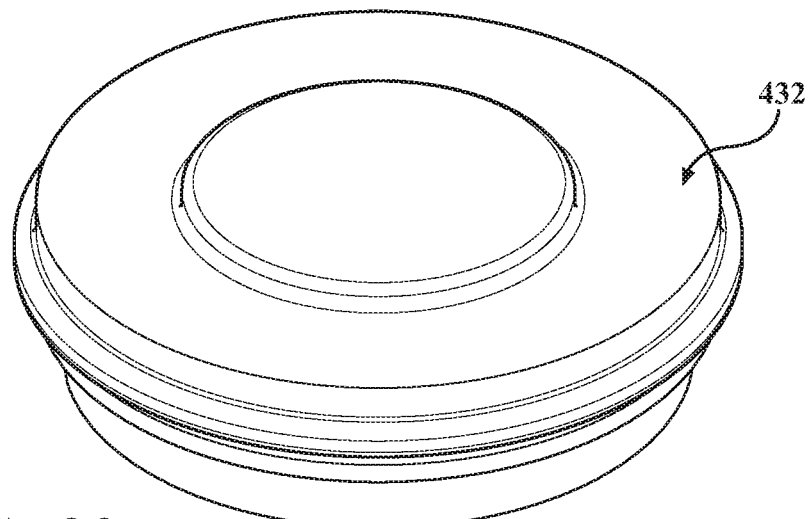
FIG. 20 is a top, perspective view of the upper component of the button shown during formation.
Figure 21:
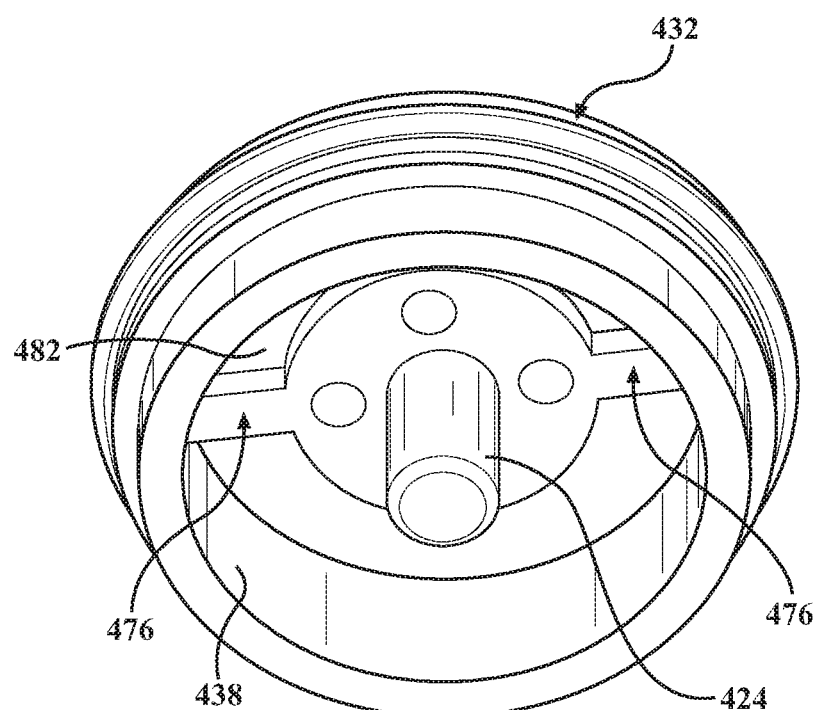
FIG. 21 is a bottom, perspective view of the upper component of the button shown during formation.

With reference now to FIGS. 19-21 as well, which illustrate various perspective view of the button 400, and the respective upper and lower components 410, 416 thereof, a method of assembling the button 400 will be discussed. To assemble the upper component 410 of the button 400, the outer member 412 is secured to the inner member 414 (e.g., via press-fitting together the respective inner and outer members 414, 412, via overmolding, and/or through the use of an adhesive). More specifically, in one method of assembly, the plunger 424 is positioned within the recess 446 formed in the cap 432, and the outer wall 438 of the inner member 414 is positioned adjacent the outer wall 436 of the outer member 412 such that the outer member 412 is supported by (atop) the flange 442.

To assemble the lower component 416 of the button 400, similar to the upper component 410, the outer member 418 is secured to the inner member 420 (e.g., via press-fitting together the respective inner and outer members 420, 418, via overmolding, and/or through the use of an adhesive). More specifically, in one method of assembly, the outer member 418 is overmolded to the inner member 420 such that the second segment 474*ii* of the base wall 466 of the inner member 420 is received within the annular recess 464 defined by the radial flange 460 and the second segment 462*ii* of the lower wall 448 of the outer member 418 such that the second segment 474*ii* is positioned beneath the radial flange 460.

The respective upper and lower components 410, 416 can then be connected (e.g., via an adhesive) such that a seal is formed between the respective upper and lower components 410, 416 to inhibit (if not entirely prevent) the entry of water into the button 400 other than through the opening(s) 434 in the cap 432 of the upper component 410. Either prior to or following connection of the respective upper and lower components 410, 416 of the button 400, the opening(s) 434 in the cap 432 can be formed (e.g., by drilling). As seen in FIGS. 20 and 21, initially (i.e., prior to formation of the opening(s) 434), the plunger 424 is supported by one or more bridge members 476 that extend inwardly from the outer wall 438 of the inner member 414 towards the plunger 424. More specifically, the bridge member(s) 476 include feet 478 (FIG. 22) that are received in apertures 480 formed in an underside 482 of the cap 432. As the openings 434 are formed in the cap 432, the bridge member(s) 476 are ruptured/fractured, leaving the feet 478 in place in the apertures 480, thereby allowing for movement of the plunger 424 Relative to the lower component 416.

Figure 22:
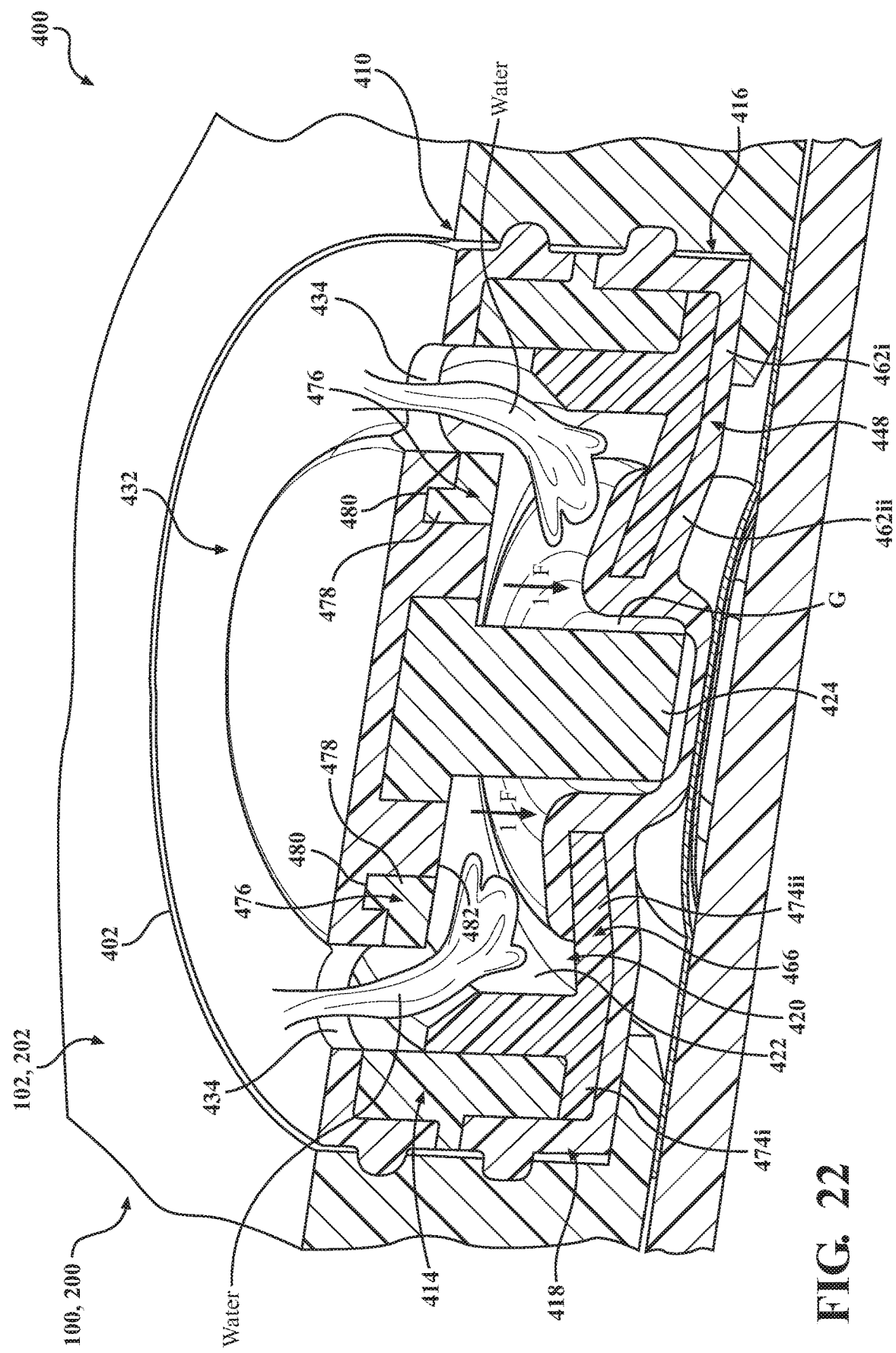
FIG. 22 is a cross-sectional view of the button shown positioned within the image capture device.

With reference to FIG. 22, which provides a cross-sectional view of the button 400 shown positioned within the recess 402 formed in the body 102/202 of the image capture device 100/200, during use of the image capture device 100/200 in an underwater environment, as the image capture device 100/200 is submerged, the image capture device 100/200 is subjected to external pressure. Absent the structure of the button 400 described herein, the external pressure applied in the underwater environment would otherwise act on the switch 404 (FIGS. 6, 8), resulting in inadvertent, unintentional operation of the image capture device 100/200. For example, in the context of shutter operation, the application of constant underwater pressure would cause perpetual actuation of the switch 404, rendering the image capture device 100/200 unusable. The components and configuration of the button 400 described herein, however, resist and counteract the external pressure applied in the underwater environment to prevent actuation of the switch 404 until a threshold pressure (force) is applied to the button 400 that is greater than the external pressure applied by the water. More specifically, the inner member 420 of the lower component 416 resists deflection of the outer member 418 until the threshold pressure is reached. By varying the dimensions of the inner member 420 (e.g., the length of the second segment 474*ii*, the thickness of the second segment 474*ii*, the angle β, etc.), the amount of resistance to the external pressure applied by the water offered by the button 400 can be altered and customized. For example, when intended for use in greater underwater depths, the length of the second segment 474*ii*, the thickness of the second segment 474*ii*, the angle β, etc. can be increased or decreased as required to accommodate for the increased pressure.

As discussed above, the opening(s) 434 formed in the cap 432 of the upper component 410 allow water to enter the internal cavity 422 of the button 400 upon submersion. As the internal cavity 422 fills, the water applies outward pressure that offsets the external pressure, and the water collected in the gap G between the plunger 424 and the inner wall 456 of the receptacle 454 applies an inwardly directed force F that acts upon the lower component 416 (e.g., upon the inner member 420) in the direction indicated by arrow 1. The inwardly directed force F applied by the water within the button 400, however, is resisted by the inner member 420 such that minimal (if any) deflection occurs in the inner member 420 and, thus, the outer member 418, which prevents actuation of the switch 404. Upon the application of an operational pressure (force) to the button 400 (e.g., to the upper component 410) by the user, however, the plunger 424 is depressed (repositioned), and the operational pressure is transmitted to the outer member 418 via contact between the plunger 424 and the receptacle 454. The operational pressure applied by the user supplements the force F applied by the water within the internal cavity 422, thereby reducing the overall magnitude of the operational pressure that must be applied by the user to overcome the resistance offered by the inner member 420 and reach the threshold pressure. When the threshold pressure is reached (i.e., when the resistance offered by the inner member 420 is overcome), the inner member 420 is deflected downwardly to cause resultant deflection of the dome 408 (FIG. 6), and, thus, actuation of the switch 404, and corresponding operation of the image capture device 100/200. As the inner member 420 is deflected downwardly, an internal, opposing biasing force is created that returns the inner member 420 to its initial position upon release of the button 400 by the user.

By virtue of the assistance provided by the force F created by the water in the internal cavity 422 of the button 400, the operational pressure required to actuate the switch 404 is less than that which would otherwise be required in a dry environment. By altering the configuration of button 400 (e.g., the volume of the internal cavity 422, the volume of the gap G, etc.), the volume of water acting upon the button 400, and, thus, the switch 404, can be varied such that the operational pressure required in dry environments more closely approximates the operational pressure required in underwater environments to create a more consistent tactile feel for the user. While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result, and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various steps, elements, components, regions, and/or sections, these steps, elements, components, regions, and/or sections should not be limited by use of these terms in that these terms are used to distinguish one step, element, component, region, or section from another. Thus, unless expressly stated otherwise, a first step, element, component, region, or section could be termed a second step, element, component, region, or section without departing from the scope of the present disclosure.

Each and every claim is incorporated as further disclosure into the specification, and represents embodiments of the present disclosure. Also, the phrases "at least one of A, B, and C" and "A and/or B and/or C" should each be interpreted to include only A, only B, only C, or any combination of A, B, and C.

What is claimed is:

1. A button for use with an image capture device in an underwater environment, the button comprising:
   a movable plunger configured to cause actuation of the image capture device; and
   upper and lower components collectively defining an internal cavity configured to receive the movable plunger, the upper and lower components configured such that actuation of the image capture device is prevented until a threshold pressure is applied to the upper component that is greater than external water pressure applied in the underwater environment, the upper component including at least one opening configured to allow water to enter the internal cavity to modify an internal pressure within the internal cavity so as to reduce the threshold pressure required to actuate the image capture device in the underwater environment.

2. The button of claim 1, wherein the upper component includes a first sealing member and the lower component includes a second sealing member, the first and second sealing members configured to engage an internal surface of the image capture device to inhibit water from entering the image capture device.

3. The button of claim 2, wherein the first sealing member is formed integrally with the upper component and the second sealing member is formed integrally with the lower component.

4. The button of claim 1, wherein the lower component defines a receptacle configured to receive the movable plunger.

5. The button of claim 4, wherein the movable plunger defines a first transverse cross-sectional dimension and the receptacle defines a second transverse cross-sectional dimension larger than the first transverse cross-sectional dimension such that a gap is defined between the movable plunger and the receptacle that is configured to collect water entering the button.

6. The button of claim 1, wherein the upper component includes inner and outer members.

7. The button of claim 6, wherein the inner and outer members of the upper component are configured as discrete structures.

8. The button of claim 7, wherein the lower component includes inner and outer members.

9. The button of claim 8, wherein the inner and outer members of the lower component are configured as discrete structures.

10. The button of claim 1, wherein the upper component and the lower component are sealed together to inhibit water from entering the button other than through the at least one opening in the upper component.

11. The button according to claim 10, wherein the lower component defines a channel configured to receive the upper component.

12. The button of claim 1, wherein the movable plunger is secured to one of the upper and lower components.

13. An image capture device configured for use in an underwater environment, the image capture device comprising:
   a body defining a recess;
   a switch positioned within the body; and
   a button positioned within the recess in the body such that the button is movable from an inactive position to an active position to thereby actuate the switch and cause operation of the image capture device, the button configured such that movement from the inactive position to the active position is prevented until a threshold pressure is applied to the button that is greater than external water pressured applied to the button in the underwater environment, wherein the button includes at least one opening configured to allow water to enter the button to modify an internal pressure thereof and thereby reduce the threshold pressure required to move the button from the inactive position to the active position in the underwater environment.

14. The image capture device of claim 13, wherein the button includes:
a plunger;
a lower component; and
an upper component secured to the lower component, wherein the plunger is secured to one of the lower and upper components and the lower and upper components collectively define an internal cavity configured to receive the plunger such that the plunger is movable within the internal cavity.

15. The image capture device of claim 14, wherein the at least one opening is formed in the upper component, the at least one opening being in communication with the internal cavity such that water enters the internal cavity through the at least one opening.

16. The image capture device of claim 14, wherein the lower component includes a first sealing member and the upper component includes a second sealing member, the first and second sealing members being configured to engage an internal surface of the body to inhibit water from entering the body.

17. The image capture device of claim 16, wherein the first sealing member is formed integrally with the lower component and the second sealing member is formed integrally with the upper component.

18. A method of assembling a button for use with an image capture device, the method comprising:
forming an upper component by securing together inner and outer members;
forming a lower component by securing together inner and outer members;
securing a plunger to one of the upper and lower components;
connecting the upper component and the lower component such that actuation of the image capture device is prevented until a threshold pressure is applied to the upper component that is greater than external water pressure applied to the upper component in an underwater environment upon submersion of the image capture device; and
forming at least one opening in the upper component such that water is allowed to enter an internal cavity defined between the upper component and the lower component to modify an internal pressure within the internal cavity so as to reduce the threshold pressure required to actuate the image capture device in the underwater environment.

19. The method of claim 18, wherein connecting the upper and lower components includes positioning the plunger within a receptacle of the lower component, the receptacle defining a transverse cross-sectional dimension greater than a transverse cross-sectional dimension defined by the plunger such that a gap is formed between the plunger and the receptacle that is configured to collect water entering the button.

20. The method of claim 18, wherein connecting the upper component and the lower component includes sealing the upper component and the lower component together to inhibit water from entering the button other than through the at least one opening in the upper component.

* * * * *